US010999985B2

(12) United States Patent
Watson (10) Patent No.: US 10,999,985 B2
(45) Date of Patent: May 11, 2021

(54) FOGPONIC PLANT GROWTH SYSTEM (71) Applicant: Michael C. Watson, Hope (CA)

(72) Inventor: Michael C. Watson, Hope (CA)

(*) Notice: Subject to any disclaimer, the term of this patent is extended or adjusted under 35 U.S.C. 154(b) by 299 days.

(21) Appl. No.: 15/974,356

(22) Filed: May 8, 2018

(65) Prior Publication Data

US 2018/0368346 A1 Dec. 27, 2018

Related U.S. Application Data

(60) Provisional application No. 62/505,025, filed on May 11, 2017.

(51) Int. Cl.
| | | |
|---|---|---|
| A01G 31/06 | (2006.01) | |
| A01G 31/00 | (2018.01) | |
| A01G 29/00 | (2006.01) | |
| A01G 9/02 | (2018.01) | |

(52) U.S. Cl.
CPC ............. *A01G 31/06* (2013.01); *A01G 29/00* (2013.01); *A01G 9/027* (2013.01)

(58) Field of Classification Search
CPC ........ A01G 31/06; A01G 29/00; A01G 31/00; A01G 31/02
See application file for complete search history.

(56) References Cited

U.S. PATENT DOCUMENTS

| | | | | |
|---|---|---|---|---|
| 2,062,755 A | * | 12/1936 | Lyons .................... | A01G 31/02 47/62 C |
| 4,324,069 A | * | 4/1982 | Flagg ................... | A01G 27/001 47/62 E |
| 4,332,105 A | | 6/1982 | Nir | |
| 4,514,930 A | | 5/1985 | Schorr et al. | |
| 5,557,884 A | * | 9/1996 | Deppe .................... | A01G 31/02 47/62 E |
| 5,675,932 A | * | 10/1997 | Mauney ................. | A01G 31/02 47/17 |
| 6,219,966 B1 | * | 4/2001 | Lapointe ................ | A01G 31/02 47/62 C |
| 7,823,328 B2 | * | 11/2010 | Walhovd ................ | A01G 31/02 47/62 A |

(Continued)

FOREIGN PATENT DOCUMENTS

WO WO-2018190097 A1 * 10/2018 ............. A01G 31/00

OTHER PUBLICATIONS https://www.youtube.com/watch?v=Ztk6EZ1zg84, A 1 Fogponic System, posted by J. Baker, Jul. 5, 2015.

(Continued)

*Primary Examiner* — Kristen C Hayes
(74) *Attorney, Agent, or Firm* — Oyen Wiggs Green & Mutala LLP (57) ABSTRACT

This invention relates to a modular, scalable fogponic plant growth system for growing plants individually with roots physically and fluidly isolated from one another. A high-pressure fluid delivery system operates above 150 psi and is configured for fluidly connecting at least one spray nozzle positioned within each root enclosure to simultaneously deliver fluid to the roots of each plant within a zone of root enclosures. A passive drain system continuously removes any unabsorbed fluid, such that the roots of each and every plant are physically and fluidly isolated from one another.

20 Claims, 9 Drawing Sheets

(56) References Cited

U.S. PATENT DOCUMENTS

| | | | | |
|---|---|---|---|---|
| 8,726,568 | B2* | 5/2014 | Wilson | A01G 31/00 |
| | | | | 47/62 R |
| 8,904,705 | B2* | 12/2014 | Downs, Sr. | A01G 31/02 |
| | | | | 47/62 A |
| 10,004,188 | B2* | 6/2018 | Williams | A01G 9/023 |
| 10,070,600 | B2* | 9/2018 | Orff | A01G 31/02 |
| 10,426,108 | B2* | 10/2019 | Li | A01G 25/167 |
| 10,492,387 | B1* | 12/2019 | Davison | A01G 31/00 |
| 2009/0293357 | A1 | 12/2009 | Vickers et al. | |
| 2012/0005957 | A1* | 1/2012 | Downs, Sr. | A01G 31/02 |
| | | | | 47/62 A |
| 2014/0144078 | A1 | 5/2014 | Gonyer et al. | |
| 2018/0035627 | A1* | 2/2018 | Williams | A01G 9/023 |

OTHER PUBLICATIONS https://www.youtube.com/watch?v=c8qaOBCCxN4, Vertical Grow Fog Tower, posted by J. Baker, Jul. 20, 2015.
Aeromist Nozzles Specification (date unknown).
Aeromist Misting pumps offer, www.aeromist.com, 2016.
CAT Pumps Inlet Condition Check-List (date unknown).
AEssence AEtrium 4 brochure (date unknown).
AEssence AEtrium Double Deck brochure (date unknown).

\* cited by examiner

FOGPONIC PLANT GROWTH SYSTEM

FIELD OF THE INVENTION

The invention relates to systems and methods for cultivating plants. The invention further relates to a fogponic system and method. More specifically, the present invention pertains to a fogponic growing system that is modular and scalable for growing and harvesting valuable plants in a mass production environment where each individual plant can be monitored separately.

BACKGROUND OF THE INVENTION

Aeroponics is a process of growing plants using air as the growth medium. In an aeroponic system, the plant is suspended such that its stems, leaves and any fruit grow in a vegetative zone above the suspension medium. The roots dangle below the suspension medium in an area commonly referred to as a root zone. The dangling roots receive water and other nutrients through an atomized spray of nutrient-laden water.

Aeroponic systems employ sprayers, misters, foggers, or other devices such as ultrasonic atomizers to create a fine mist of solution to deliver water and nutrients to plant roots. High-pressure aeroponic systems deliver nutrient fluid through atomizers or other misters operating at pressures in excess of 75-80 psi. In commercial applications, a hydro-atomizing spray is employed to cover large areas of roots utilizing air pressure misting.

The key to root development in an aeroponic environment is the size of the water droplet. Water droplet size is crucial for sustaining aeroponic growth. Too large of a water droplet means less oxygen is available to the root system. Too fine of a water droplet produces excessive root hair without developing a lateral root system for sustained growth in an aeroponic system. Maintenance and the potential for component failure, such as degradation of the spray due to mineralization of mist heads, is a concern with aeroponic systems, as restricted access to water resulting from such a failure will cause aeroponically grown plants to wilt.

Aeroponic systems that produce droplets below 30 microns fail to achieve continuous aeroponic growth due to their need to supply droplets in such a high concentration that liquid saturation occurs whilst meeting the liquid requirement for horticulture. Very small droplet sizes, such as 5-20 microns, need to be supplied in extremely high densities otherwise they cannot provide enough water to actually grow a plant. However, such a high concentration of very small droplets virtually prevents air getting to the roots and thus the roots may die unless the system is turned off periodically in order to allow the roots to dry and gain access to air. Thus, aeroponic systems with droplets below 30 micron tend to be operated with a clear on and off period due to this saturation. Aeroponic systems that produce droplets above 100 microns are also incapable of continuous aeroponic growth due to a rapid saturation that is caused by droplets of this size.

A variation of the mist technique employs the use of ultrasonic nebulizers or foggers to mist nutrient solutions in low-pressure aeroponic devices. Foggers can also be employed in a high-pressure fluid delivery system. Fogponics, an advanced form of aeroponics utilizes a 5-30 µm mist within the rooting chamber and as use for a foliar feeding mechanism. Plants best absorb particles from the 1-25 µm range. By supplying water and nutrients at the smaller particulate size means faster absorption such that the plants require less energy in root growth and mass, and are able to still sustain a large plant Fogponics use less water and energy compared to traditional and hydroponic systems, with the possibility of higher yields.

There are several benefits to an aeroponic system, including increased air exposure to the plant's roots, which stimulates growth through the abundance of oxygen, along with direct application of nutrients and water through the atomized or nebulized mist. Complete access to carbon dioxide in the air is also achieved, which is necessary for photosynthesis. Further, the risk of unhealthy plants in an aeroponic garden is decreased over traditional methods as there is no "dirt" soil involved. Conditions are more aligned to a laboratory standard so the risk of infestation and disease is lessened. The misting spray means is also under close control and can be rapidly adjusted to prevent contamination. The spray itself may be sterilized, adjusted or ceased by the user if desired. The absence of soil provides the grower an increased level of control over the plant development.

Traditional aeroponic gardens have several drawbacks to their design, which inherently limit plant growth and do not provide an optimal growing environment.

Some systems utilize atomizers or other misters, which inefficiently spray the nutrient fluid such that the root zone experiences regions of "wet" and "dry" zones. Wet zones receive too much nutrient fluid such that gas exchange ($O_2$ and/or $CO_2$) is hindered, while dry zones do not receive sufficient nutrient fluid (if any at all) such that nutrient uptake by the roots is inadequate. In either case, wet zones and dry zones negatively affect plant growth and fruit production.

U.S. Pat. No. 4,514,930 to Schorr describes an aeroponic plant apparatus and method that utilizes an enclosed chamber with a plurality of support positions for a grid of plant roots.

An aqueous composition of tap water, concentrated hormone, nutrient or other plant growth composition is formed through a suction venturi and directed onto the plant roots through mist nozzles. A timer controlled solenoid valve is provided to regulate the water flow and drain. While this device describes an acroponic growing device, it is provided in a form that aligns several plants in close proximity to one another.

U.S. Pat. No. 4,332,105 to Nir describes an acroponic growth and development apparatus for plants including a growing unit with at least one perforate plant support and a time controlled misting means. This device describes an aeroponic growth setup that employs unit enclosures for plant roots, a pump and circulation means for a nutrient solution, along with timing controlled sprayers for application of the nutrient solution on the plant roots. No mention is made of the specific design of each unit enclosure or of a specific sprayer means.

U.S. Pat. No. 5,557,884 to Deppe describes another aeroponic growing system comprising a nutrient reserve reservoir containing a supply of liquid nutrients; a main nutrient reservoir connected to the nutrient reserve reservoir and supplied with liquid nutrients from the nutrient reserve reservoir; a pump connected to the main reservoir for removing the nutrients from the main nutrient reservoir; a plurality of plant tubes in which a plurality of plants will be supported; a piping system connected to the outlet of the pump and the interior of the plant tube; a spray head connected to the piping system for oxygenating and dispersing the liquid nutrients into the interior of the plurality of plant tubes; and means for controlling a level of liquid nutrients in the interior of the plurality of plant tubes.

U.S. Published Patent Application No. 2009/0293357 describes an apparatus and method for delivering an atomized spray of air and nutrient rich liquid through a shaped nozzle end for controlling and varying the dimensions and shape of the delivered fog, and capable of providing a droplet size of between 30 and 80 micron and not below S micron. The specifically designed nozzle controls the droplet size and spray pattern for optimal root coverage and absorption. The atomizer comprises a nozzle, the nozzle comprising: first and second mixing chambers, wherein the second mixing chamber is distal to and connected with the first mixing chamber; a liquid orifice configured to connect to a nutrient rich liquid source, wherein the liquid orifice opens into the first mixing chamber; one or more air ports configured to connect to a compressed air supply, wherein the one or more air ports open into the first mixing chamber; and a nozzle outlet at the distal end of the nozzle in connection with and distal to the second mixing chamber.

U.S. Pat. No. 8,904,705 teaches a system comprising a series of aeroponic growing units, wherein the plant roots are supported within individual enclosures. The enclosure houses a sprayer, an interior volume of plant nutrient solution and a plumbing system for accepting and distributing the aqueous water-nutrient solution. The internal sprayer is a double T-shaped mister that sprays an atomized mist directed from a first set of nozzles onto the plant roots, along with a second set of nozzles directed toward the base of the enclosure to aerate the interior volume of plant nutrient solution. The T-shaped mister provides circumferential coverage of the plant roots, while the aeration of the plant nutrient solution provides an aerated solution that accelerates plant growth through a hybrid process of Nutrient Film Technique (NFT) called a Hyperactive Aeroponic Shallow Water Culture (HAS Culture). Several interconnected aeroponic growing units may be stationed in a parallel grid to provide ample space for rapid growth of crops, while supplying the water and nutrient solution through a network of pipes and tubes between units.

US 2014/0144078 describes an aeroponic growth system comprising a plurality of modular aeroponic units each including at least one spray nozzle directed into a root zone; a lighting system associated with the plurality of the modular units and configured for emitting light in a vegetative zone; a pressurized reservoir configured for housing a nutrient containing fluid; and a nutrient feeding system configured for fluidly and selectively connecting each of the modular units to the pressurized reservoir in parallel, wherein the nutrient feeding system includes a pressure stop valve associated with each of the modular units. When one of the modular units are disconnected to the associated pressure stop valve, the pressure stop valve is configured for preventing the fluid from flowing from the pressurized reservoir through the pressure stop valve, and the other modular units connected to the nutrient feeding system remain fluidly connected to the pressure reservoir.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This invention relates to a fogponic plant growth system for growing plants with roots physically and fluidly isolated from one another, comprising: a plurality of root enclosures each comprising an "open drain", and configured for supporting one plant, wherein two or more root enclosures are positioned in a row, and rows are arranged in parallel; a high pressure pump system that is in fluid communication with one or more fluid reservoirs, wherein the pump system is configured for drawing fluid from the one or more reservoirs; a high pressure fluid delivery system configured for fluidly connecting each of the root enclosures to the high pressure pump system, wherein the fluid delivery system includes one or more pressure stop valves configured to regulate the flow of fluid to one or more rows of root enclosures; at least one spray nozzle operatively associated with the high pressure delivery system and positioned within each root enclosure directed towards the roots, and a control system directing the pump system and the pressure stop valves; wherein when one or more rows are connected to an associated pressure stop valve "in the on position", the fluid delivery system directs the fluid to each spray nozzle associated with a zone of root enclosures; wherein when one or more rows are connected to an associated pressure stop valve "in the off position", which is associated with a zone of root enclosures; and wherein the stop valves are configured for preventing the fluid from flowing from the reservoir through a pressure stop valve to one or more zones of root enclosures while the other zone(s) of root enclosures connected to the fluid delivery system remain fluidly connected to the high pressure pump system.

The invention also relates to a fogponic root growth system for growing the roots of young plants, comprising: a plurality of horizontally-oriented plant tubes, each tube comprising a series of holes configured to contain one unit of support non-soil plant growth medium within a root basket; a high pressure pump system that is in fluid communication with one or more fluid reservoirs, wherein the pump system is configured for drawing fluid from the one or more reservoirs: a high pressure fluid delivery system configured for fluidly connecting each of the root enclosures to the high pressure pump system, wherein the fluid delivery system includes one or more pressure stop valves configured to regulate the flow of fluid to one or more plant tubes; at least one spray nozzle operatively associated with the high pressure delivery system and positioned within each plant tube directed towards the root zone, and a control system directing the pump system and the pressure stop valves; wherein when one or more plant tubes are connected to an associated pressure stop valve "in the on position", the fluid delivery system directs the fluid to each spray nozzle associated with a plant tube; wherein when one or more plant tubes are connected to an associated pressure stop valve "in the off position", which is associated with a zone of plant tubes; and wherein the stop valves are configured for preventing the fluid from flowing from the reservoir through a pressure stop valve to one or more zones of plant tubes while the other zone(s) of plant tubes connected to the fluid delivery system remain fluidly connected to the high pressure pump system.

The foregoing has outlined rather broadly certain features of the present invention in order that the detailed description of the invention that follows may be better understood. Additional features of the invention will be described hereinafter that form the subject of the claims. It should be appreciated by those skilled in the art that the conception and the specific embodiments disclosed may be readily utilized as a basis for modifying or designing other structures for carrying out the same purposes as the disclosed bioreactor. It should also be realized by those skilled in the art that such equivalent constructions do not depart from the spirit and scope of the invention as set forth in the appended claims.

BRIEF DESCRIPTION OF THE DRAWINGS

The accompanying figures incorporated in and forming a part of the specification, illustrate several aspects of the present invention and together with the description serve to explain the principles of the invention.

DETAILED DESCRIPTION OF THE INVENTION

An aeroponic system and method for growing, monitoring and harvesting plants is disclosed in various embodiments. The layout of the system is modular and hence may be configured to meet a number of different site requirements. Likewise, the system may be reconfigured while in use to accommodate changing needs and conditions. Hence, it is to be understood that the system may be implemented in a number of embodiments and while the system will be explained with regard to some specific embodiments, other embodiments are within the scope of the invention and will be readily apparent to those of skill in the art.

One skilled in the relevant art, however, will recognize that the various embodiments may be practiced without one or more of the specific details, or with other replacement and/or additional methods, materials, or components. In other instances, well-known structures, materials, or operations are not shown or described in detail to avoid obscuring aspects of various embodiments of the invention.

Similarly, for purposes of explanation, specific numbers, materials, and configurations are set forth in order to provide a thorough understanding of the invention. Nevertheless, the invention may be practiced without specific details. Furthermore, it is understood that the various embodiments shown in the figures are illustrative representations and are not necessarily drawn to scale.

Reference throughout this specification to "one embodiment" or "an embodiment" or variation thereof means that a particular feature, structure, material, or characteristic described in connection with the embodiment is included in at least one embodiment of the invention, but do not denote that they are present in every embodiment. Thus, the appearances of the phrases such as "in one embodiment" or "in an embodiment" in various places throughout this specification are not necessarily referring to the same embodiment of the invention. Furthermore, the particular features, structures, materials, or characteristics may be combined in any suitable manner in one or more embodiments. Nonetheless, it should be appreciated that, contained within the description are features which, notwithstanding the inventive nature of the general concepts being explained, are also of an inventive nature.

This system is designed to support the cultivation of plants such as medicinal plants and other plants of value especially to the pharmaceutical industry. The design and use of the system will be described and taught using medical marijuana as an example. It is to be understood, however, that the system can be used to cultivate other plants and is not to be restricted to just medical marijuana.

Plants are grown within a sanitary environment in a system comprising a plurality of root enclosures fluidly isolated from one another in a grid layout, wherein individual plants may be identified, monitored, their progress tracked and recorded. Plants may be managed within zones, which may range from one plant to about 50.

The system is a modular and scalable aeroponic system that can accommodate large plant growth given the ample separation between root enclosures used to house each roots system. The space between growing units is dependent upon user preference and the intended crop to be harvested. The connection between units may be adjusted by changing the length of connected pipes. This provides the user with flexibility to grow large-flowering crops that consume a considerable volume above the root enclosures.

Overview of the System

Figure 1:
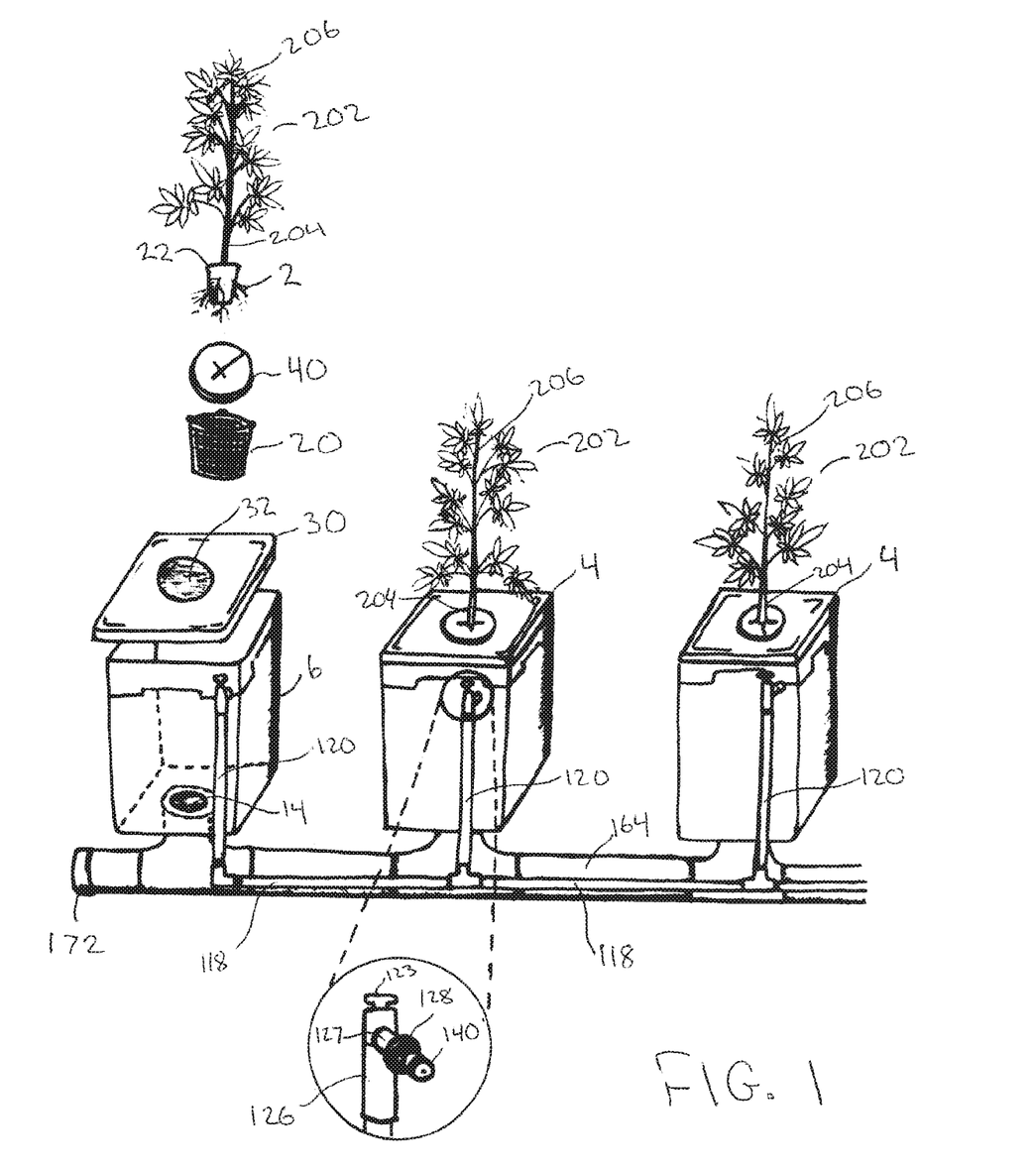
FIG. 1 is a perspective view illustrating general aspects of one row of root enclosures and some of the piping according to one embodiment.
Figure 6:
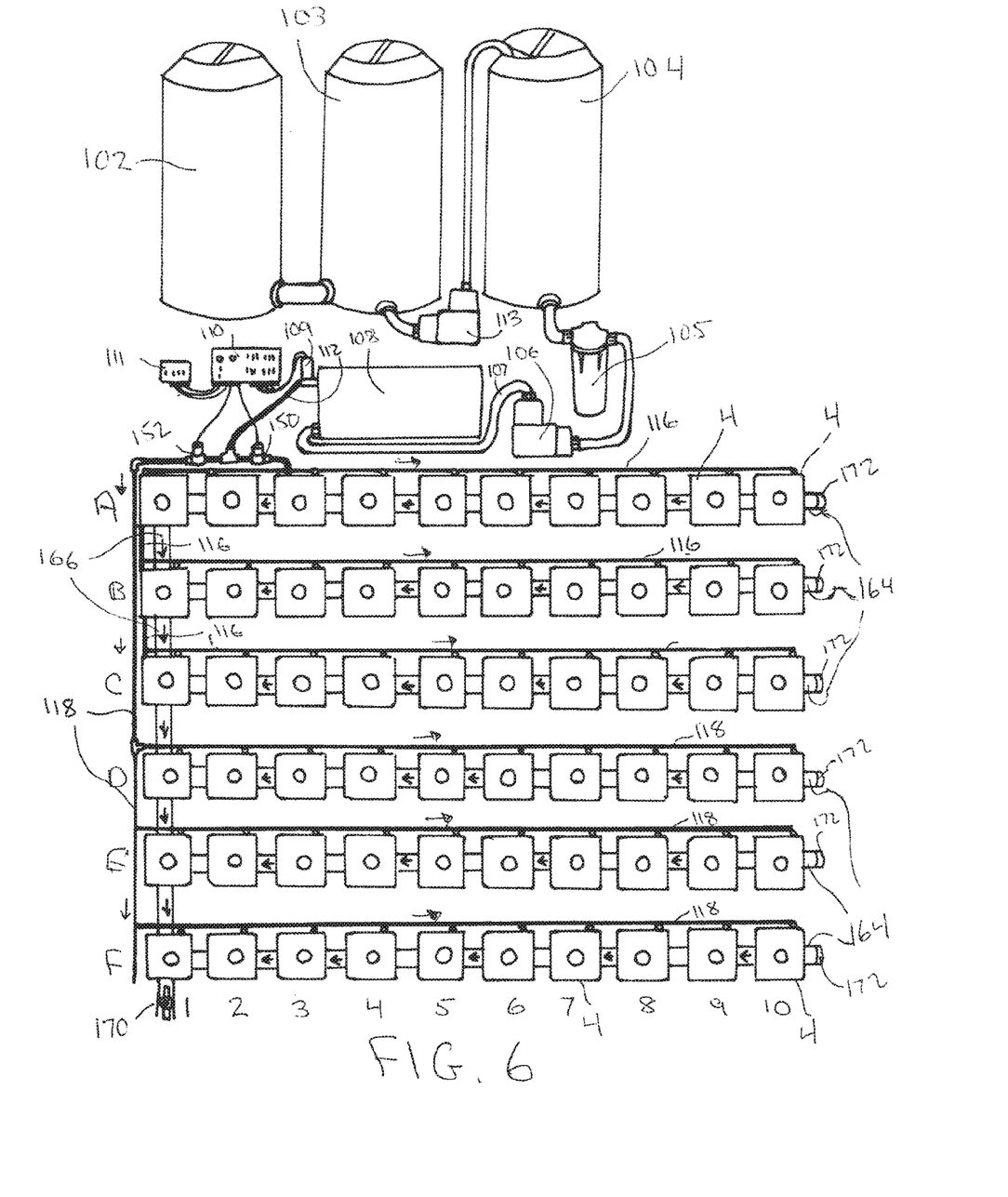
FIG. 6 is an overhead perspective view illustrating the various components and the flow of liquid through the pipes according to one embodiment of a system.

FIG. 1 illustrates a plurality of root enclosures placed in a row according to one embodiment. FIG. 6 shows how rows of root enclosures are arranged in parallel to create one embodiment of a grid configuration, wherein all of the root enclosures within a zone are interconnected via a high-pressure fluid delivery system and a pipe network to collect unabsorbed fluid. One embodiment of the layout of the system illustrated by FIG. 6 shows a high-pressure pump 108 provides high-pressure fluid 101 through Zone One tubes 116 or Zone Two tubes 118, wherein the configuration allows for each root enclosure 4 to receive a quantity of atomized or nebulized fluid 101. This system of root enclosures distributed within a grid layout enables zones to be defined and individual plants to be identified (e.g., Zone 3; Row 3. Plant 5). A computerized sensing system enables each individual plant to be monitored and it's growth history tracked.

FIG. 1 shows one embodiment wherein each root enclosure 4 comprises a container 6 with a root basket 20 positioned within the orifice 32 of the container cover 30. A plug 40 mounted in the orifice 32 of the container cover 30 directly above the root basket 20, supports the lower stem 204 of a plant 202 positioned within the root basket 20 with the roots projecting downwards from the root basket 20 into the lower portion of the container 6. A spray nozzle 140 positioned within the sidewall 8 of the container 6 provides nebulized fluid 101 to the roots 2. The unabsorbed fluid 101 exits the container 6 through a drain 14 positioned within the bottom surface 10 of the container 6 and flows through a series of collection pipes into runoff or a waste fluid receptacle.

The vegetative zone, defined to be the entire area above the container cover 30, comprises lights configured to provide radiation. Atmospheric conditions such as air-flow, humidity, temperature, etc. are also monitored and adjusted to provide the optimal conditions for the particular species of plants. The sanitary design of the system eliminates the need for UV irradiation post harvesting.

Root Enclosures Each plant is housed and grown within it's own unique root enclosure such that the fluid that is nebulized onto the roots of each plant does not come into contact with the roots of the other plants. The unabsorbed portion of the fluid is continuously drained off through the bottom of the container and flows through the fluid collection pipes to run-off or a used fluid receptacle. The system design supports the sterility of the environment for the plants in addition to the reproducibility of the growth conditions.

Fluid is delivered via a spray nozzle positioned within the container to provide nutrition and hydration of the suspended roots in cycles of time-limited applications. The fluid can be either pure water or can contain nutrients. Thus, at some times pure water will be misted onto the roots and at other times nutrients will be misted onto the roots.

Figure 2:
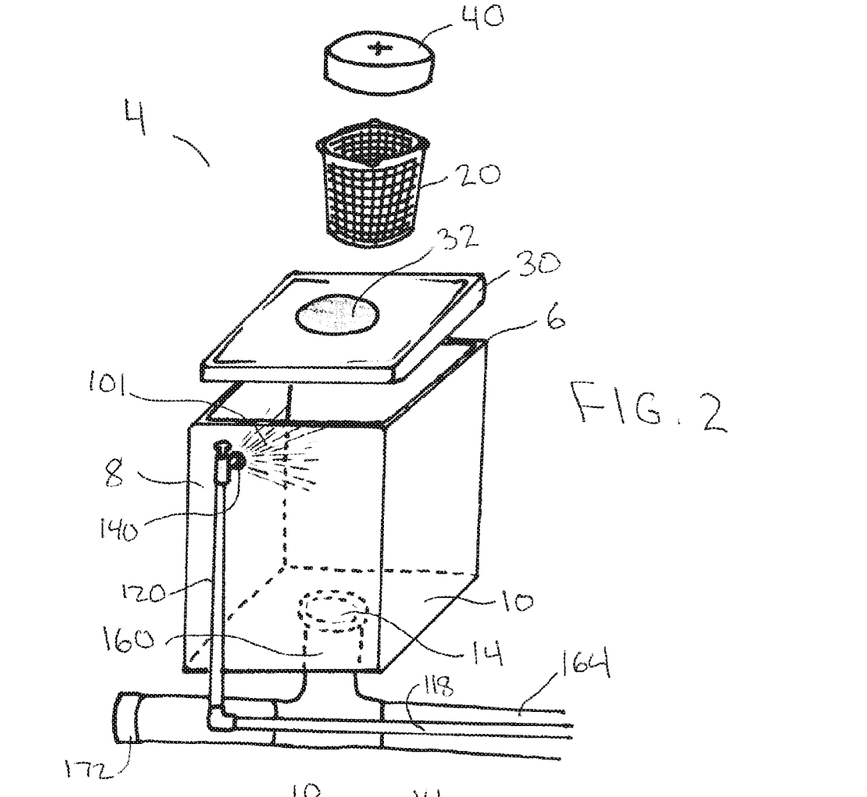
FIG. 2 is a perspective view of one embodiment showing general aspects of a root enclosure and some of the associated elements.

FIGS. 1 and 2 illustrate embodiments where each root enclosure 4 comprises a container 6 with a root basket 20 positioned within the orifice 32 of the container cover 30. A plug 40 mounted in the orifice 32 of the container cover 30 directly above the root basket 20, supports the lower stem 204 of the plant 202. The root basket 20 holds the base of the plant and provides support thereof. The roots extend downward and protrude through perforations or penetrations in the basket, allowing the roots to grow into the cavity of the container 6 and be suspended therein for spray hydration and absorption of the fluid 101. A spray nozzle 140 positioned within the sidewall 8 of the container 6 provides nebulized fluid 101 to the roots 2. The unabsorbed liquid nutrient exits the root enclosure 4 through a drain 14 positioned within the bottom surface 10 of the container 6.

Figure 3:
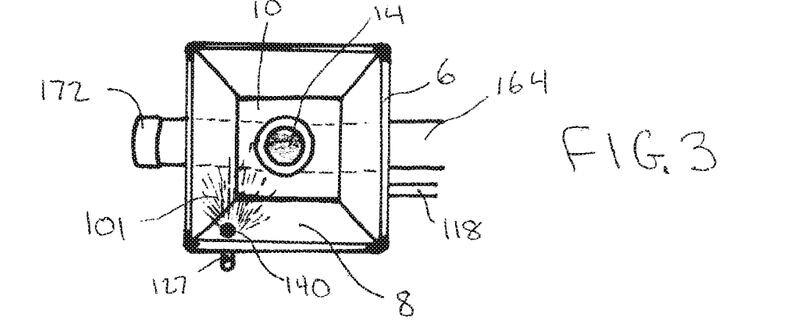
FIG. 3 is an overhead perspective view of a root enclosure and plumbing therefore in one embodiment.

FIG. 3 illustrates an overhead perspective view of a root enclosure 4 according to one embodiment. The internal contents of the root enclosure 4 are visible, including the nebulizing spray nozzle 140 that is provided high-pressure fluid 101 via an enclosure tube 120 and an extender 127, which enters through a side of the container 6. In one embodiment, the spray nozzle 140 is a nebulizer. The spray nozzle 140 directs a uniform, atomized mist of fluid 101 directly onto the suspended plant roots.

Figures 9, 10:
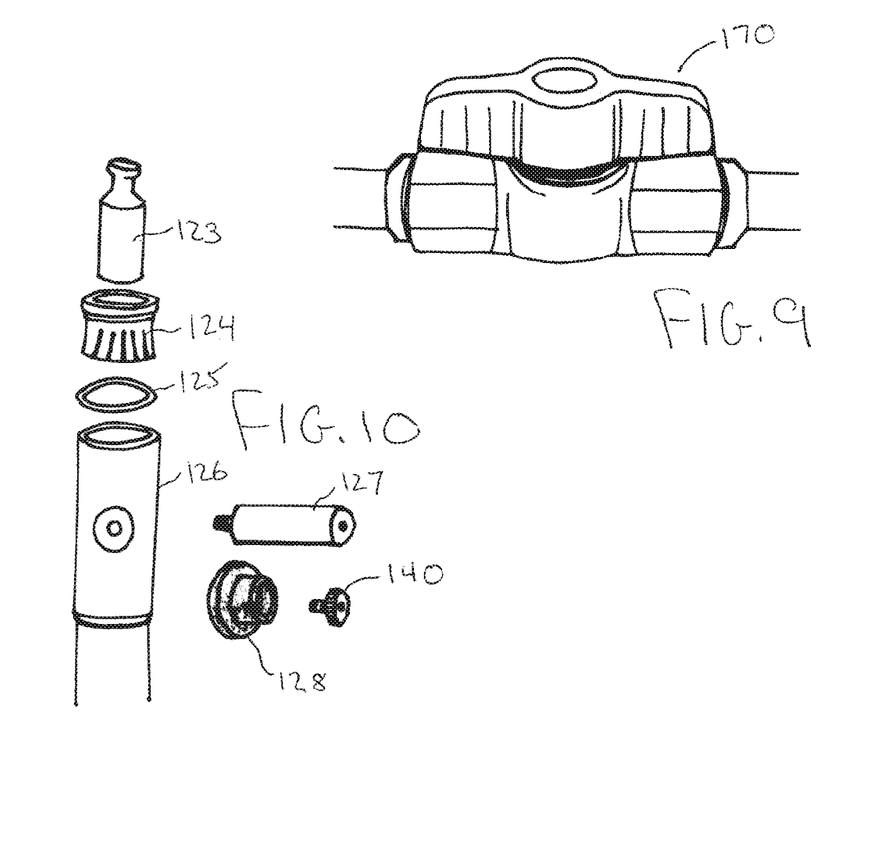
FIG. 9 is a perspective view of a shut-off valve used in one embodiment of a waste fluid collection system.
FIG. 10 is a perspective view of a sprayer assembly.

FIGS. 2 and 10 show one embodiment of the fluid delivery apparatus. A spray nozzle 140 attached to an extender 127 is mounted within the side-wall 8 of the container 6, secured by a rubber grommet 128. The spray nozzle 140 provides an atomizing or nebulizing means to communicate high-pressure flow of fluid 101 from the enclosure tube 120 to the roots of a plant. Enclosure tubes 120 branch off of the Zone One tubes 116 or Zone Two tubes 118 running along the length of each row of root enclosures 4. High-pressure fluid 101 is delivered to each of the Zone tubes 116, 118 by the high-pressure tube 112.

Figure 4:
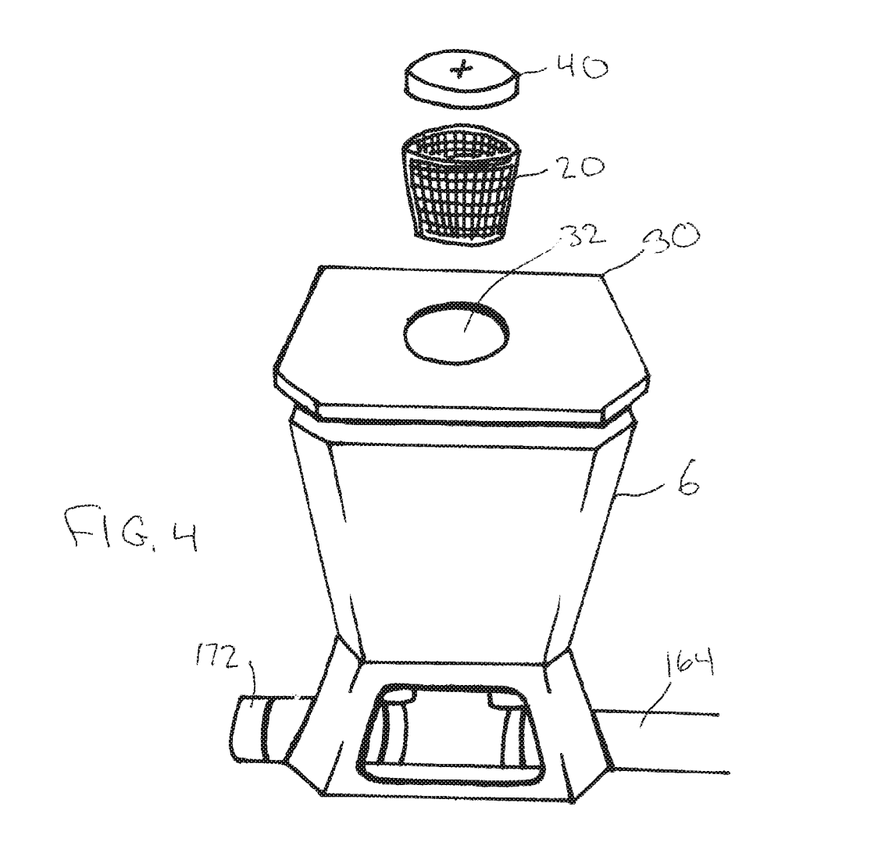
FIG. 4 is a perspective view of an embodiment of a root enclosure according to one embodiment.
Figure 5:
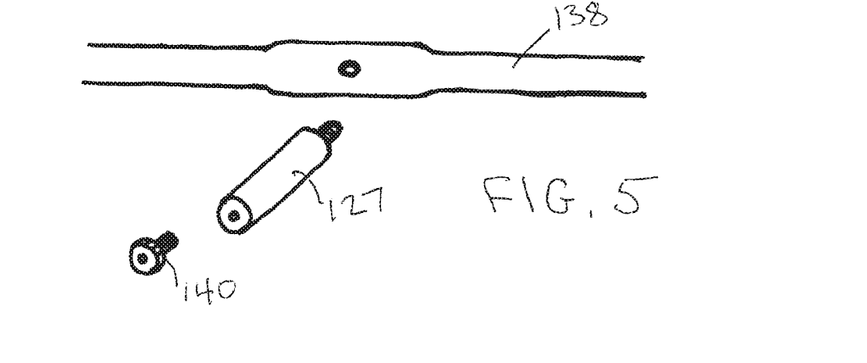
FIG. 5 is a perspective view of one embodiment of a spray nozzle and associated piping.

FIG. 4 illustrates one embodiment of a root enclosure, which includes a base that rests directly on the floor. FIG. 5 illustrates one embodiment of the high-pressure tubing, which is constructed from stainless steel welded pipes. Each of the spray nozzles 140 is arranged in a direct series along the tubing. The tubing runs along the side of one row of root enclosures. The extender 127 enters the sidewall 8 of the root enclosure to position the spray nozzle within the container 6.

The embodiments described within the figures illustrate fogponic systems incorporating one spray nozzle 140 per root enclosure 4. It is to be understood, however, that embodiments may include two or more opposing spray nozzles 140.

In one embodiment, two or more nozzles can extend linearly off of one enclosure tube 120. In such an embodiment, the housing 126 would extend beyond the point indicated by the plug 123 to incorporate a second extender 127, grommet 128 and spray nozzle 140. In one embodiment, two rows of tubing as described in FIG. 5, can be incorporated to run in parallel, for example delivering mist to the roots through opposing side-walls of a root enclosure 4.

The shape of a root enclosure can be square, rectangular, circular, hexagonal or any other shape that works well within the design of the facility. The size will be appropriate for the type of plant used. In one embodiment, the container can be about a 3.5 gallon container. The material of the root enclosure can be plastic, stainless steel, or any other material that works well and meets the cost and sterility requirements of the facility. In general, the root enclosure will be water-tight to keep the mist within the enclosure.

The plug 40 can be an appropriate porous material such as foam, cork, rubber or plastic and can range in diameter from about 1 to 12 inches. The root basket 20 will generally be of the same diameter as the plug 40, and will range in diameter from about 3 to 5 inches.

High Pressure Fluid Distribution Pipe Network

In contrast to most aeroponic and fogponic systems, which deliver fluid with a pressurized system operating below 100 psi, one embodiment of this system operates above 150 psi. According to one embodiment, the pressure within the fluid delivery system can range from about 500 to about 3,000 psi. In one embodiment, the pressure of the fluid distribution system ranges from about 800 to about 1,300 psi. In one embodiment, the pressure in the fluid distribution system ranges from about 900 to about 1,200 psi. In one embodiment, the pressure in the fluid distribution system is about 1,000 psi.

In one embodiment, if the pressure in the fluid distribution system is about 500 psi, pure water can be used as the fluid. In one embodiment, if the concentration of the nutrient is relatively high, for example around 100%, the system can operate at about 1,000 psi. In one embodiment, a pressure sensor positioned in operative communication with the fluid distribution system senses that the pressure drops below about 150 psi, signals are sent out to shut down the fluid distribution system, the lights, etc. as well as sound an alarm.

Figure 14:
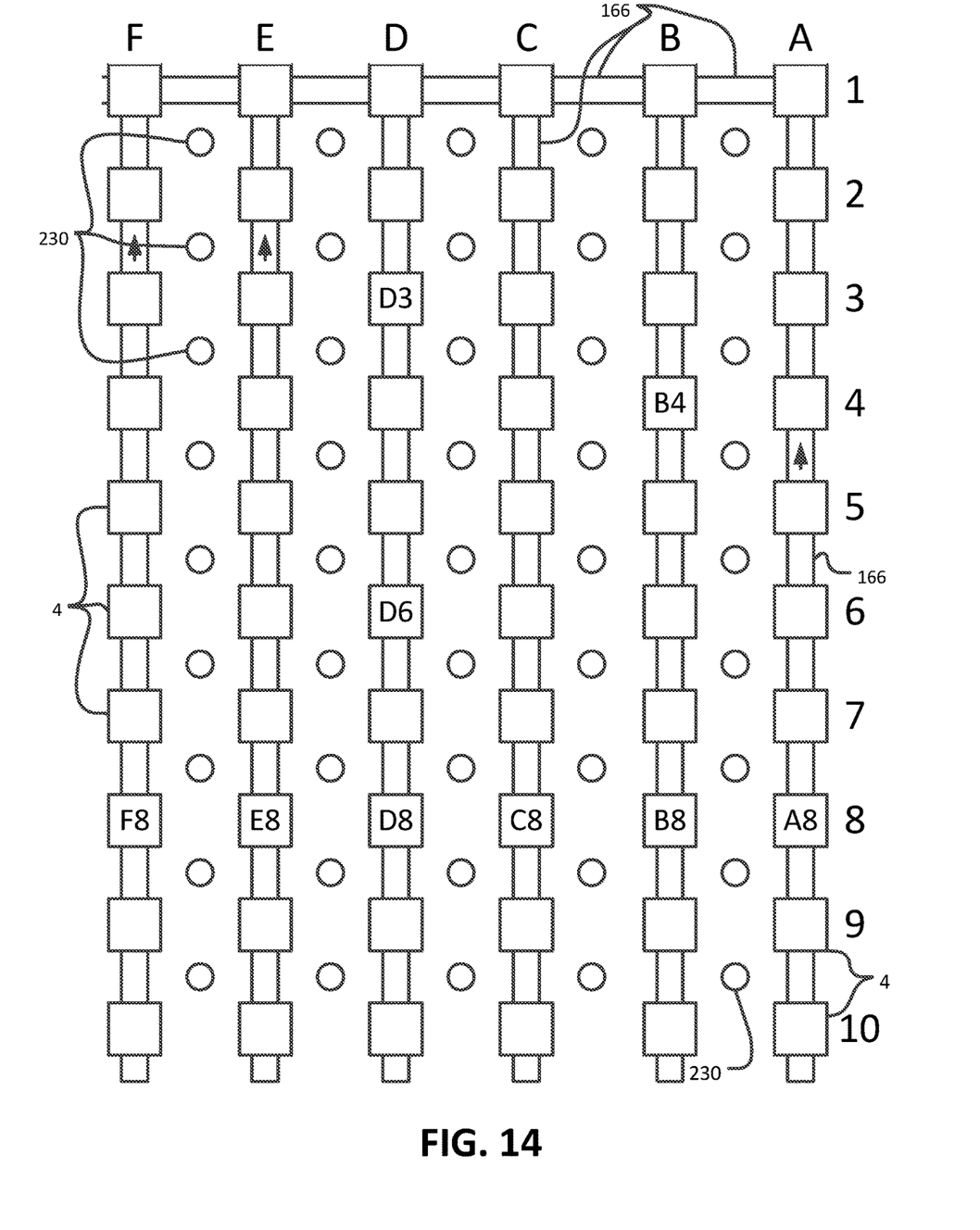
FIG. 14 is a schematic diagram of the placement of lights relative to the root enclosures in one embodiment.

As shown in FIGS. 6 and 14, a network of root enclosures 4 are positioned in a grid pattern according to one embodiment, whereby a number of rows are aligned in parallel. For illustration purposes these rows are labeled as Rows A-F. Each row contains a series of root enclosures, for example, numbered 1-10, such that each individual root enclosure can be uniquely identified (e.g., C6 or A10).

FIG. 6 demonstrates one embodiment comprising two zones, wherein each zone is determined by the layout of the high-pressure tubing. In this embodiment, rows A-C comprise one zone and rows D-F comprise another zone. Thus, root enclosures A1 to C10 are all fed by one branch of the high-pressure tubing, Zone One tubing 116, controlled at solenoid valve 150 and root enclosures D1 to F10 are all fed by another branch of the high pressure tubing, Zone Two tubing 118, controlled at solenoid valve 152. All of the root enclosures within one zone will receive approximately the same fluid under the same conditions, although there may be a slight drop in pressure across the zone as the number of root enclosures increases beyond about 30 within a zone.

In the embodiment's described herein, a solenoid is used as a high pressure stop valve, however one skilled in the art will understand when it is appropriate to incorporate other types of high pressure stop valves.

In one embodiment, illustrated in FIG. 6, sterilized water fluid 101 will be held in a water reservoir 102. The sterilized water is pumped (not shown) into a nutrient mixing tank 103, to which nutrient is added and mixed. Appropriate nutrient fluid 101 is pumped by a reservoir pump 113 into a nutrient reservoir 104. When the plants are to be fed nutrients, the nutrient fluid 101 is drawn from the nutrient reservoir 104 through a nutrient reservoir filter 105 by the "pre-pump" 106, which then feeds the high-pressure pump 108. High-pressure pump solenoid valve 109 is opened by the fluid delivery controller 110, to deliver high-pressure fluid 101, to the pump output tube 112.

When the fluid delivery controller 110 sends the command to send high-pressure nutrient fluid 101 to Zone One, Zone One solenoid valve 150 opens and delivers high-pressure nutrient fluid 101 to Zone One tubes 116. When the fluid delivery controller 110 sends commands to cease providing fluid to Zone One, Zone One solenoid valve 150 closes and then Zone Two solenoid valve 152 opens and delivers high-pressure fluid 101 to Zone Two tubes 118. High-pressure fluid is delivered to the root enclosures 4 through the individual enclosure tubes 120 branching from the Zone One or Zone Two tubes, 116, 118.

FIGS. 5 and 10 provide illustrations of embodiments of spray nozzles. FIG. 10 illustrates one embodiment of a spray nozzle used at the end of an enclosure tube 120. FIG. 5 depicts one embodiment of a spray nozzle configuration, which is used when enclosure tubes are not used in the system, but are attached directly to an extender 127, which is attached to high-pressure tubing 138. The nozzles used to nebulize the high-pressure fluid 101 are 0.01 mm to 50 mm and are generally 0.08 mm. In one embodiment, the nozzles are brass.

The size of the system can grow by adding additional rows or by adding additional root enclosures 4 to each row. The system is set up in a modular fashion to allow accommodation of a particular environment, while also providing parallel connectivity between the rows and between enclosures along a row. Zones are defined by the number of rows, including all of the root enclosures along a row.

The network of tubing originates from a high-pressure pump 108, which provides the motive force to flow the fluid 101 to each root enclosure 4. All of the tubes downstream of the pump are capable of distributing fluid 101 at high-pressure. In general the pressure of the high-pressure pump will operate around 1,000 psi, and the capability of the demand pump 106 will be about 1 gallon/minute. The tube material can be made from any appropriate material for high-pressure fluid delivery, generally around 1,000-3,000 psi, such as nylon or welded solid stainless steel, with appropriate high-pressure snap-lock fittings.

The exact setup design, grid layout and type of plumbing are dependent upon user preferences and space allotted for the facility. It is not desired to limit the present invention to a specific number of rows or root enclosures, but rather FIG. 6 is provided as an example embodiment of the present invention. It is not desired to limit the present disclosure to an exact grid layout or design, but rather to disclose a system that may be constructed based on the teachings of the present invention by one skilled in the art and modified to suit a given situation or need.

Depending on the design and needs of the plants and the facility, there can be one or more reservoirs containing various fluids such as water or different nutrient solutions. In one embodiment, water is not held in a reservoir, but delivered directly from a water line. In one embodiment the water and the nutrient solution are sterile.

Fluid Feeding Cycles

The system controller can be programmed to deliver different fluids to the root enclosures for specific period of times, spaced apart for specific intervals. These fluid feeding cycles can vary throughout a twenty-four-hour period and/or during the different phases of plant growth. The feeding cycles can range from continuous fluid delivery to intermittent fluid delivery. The duration of fluid delivery can range from about three seconds to about five minutes. For example, in one embodiment the fluid feeding cycle may entail the procedure of delivering 100% nutrient fluid to the root enclosures within one zone for thirty second duration, every ten minutes.

In one embodiment the fluid feeding cycle may entail delivering nutrient fluid to the root zone for thirty seconds every five minutes. In general, the duration of fluid delivery will range from three seconds to five minutes and the intermittent period will not exceed thirty minutes, although there may be circumstances where longer intervals may be required.

There may be a night-time feeding cycle, for example, delivering fluid every thirty minutes and a day-time feeding cycle, for example delivering fluid every five minutes. The concentration of nutrient in the fluid can range from 0% to 100%. In one embodiment 100% nutrient fluid is delivered to the root enclosures for durations of 30 seconds every ten minutes for 24 hours, followed by 24 hours of delivering 10% nutrient fluid for durations of 30 seconds every ten minutes for 24 hours, followed by 24 hours of 100% nutrient, etc. In one embodiment, the fluid may be pure water for 24 hours or more. One skilled in the art of plant horticulture would be able to determine adequate feeding cycles that meet the various specification requirements of a system.

Waste Fluid Collection System Illustrated in FIGS. 1, 2, and 3, the unabsorbed portion of nutrient solution exits a root enclosure 4 through a drain 14 positioned in the bottom surface 10 of the container 6 into a vertically oriented drain outlet pipe 160. As illustrated by the embodiment in FIG. 6, the unabsorbed nutrient from each root enclosure 4 flows from it's drain outlet pipe 160 into a horizontally oriented drain collection pipe 164 running alongside or directly underneath a row of root enclosures 4. Each drain collection pipe 164 empties it's fluid into the main collection pipe 166 traversing the rows. In one embodiment, the level of the pipes are oriented such that the fluid flows by gravity, although in some embodiments the fluid may be fed to a used fluid receptacle 180 using a gravity siphon or a pump.

In one embodiment, a 2-inch diameter drain and drain outlet pipe will be used, but these can range from ½ inch to 12 inch. The suitable drain pipe materials can be an appropriate material such as PVC piping, ABS, stainless steel, copper, etc.

The waste fluid collection system can be cleaned by closing the shut-off valve 170 located near the terminus of the main collection pipe 166, and filling the piping with cleaning solution. End-caps 172 sealing the ends of the piping can be opened to enable cleaning instruments to be inserted into a row of piping to scrub the interior of the pipes. In one embodiment where a 2 inch ABS pipe is used as the main collection pipe 166, the 2 inch end-cap has a inch female insert such that a water hose may be screwed onto the terminus of a main collection pipe 166, to clean and flush the piping system.

Fogponic Root Grower

Figure 7:
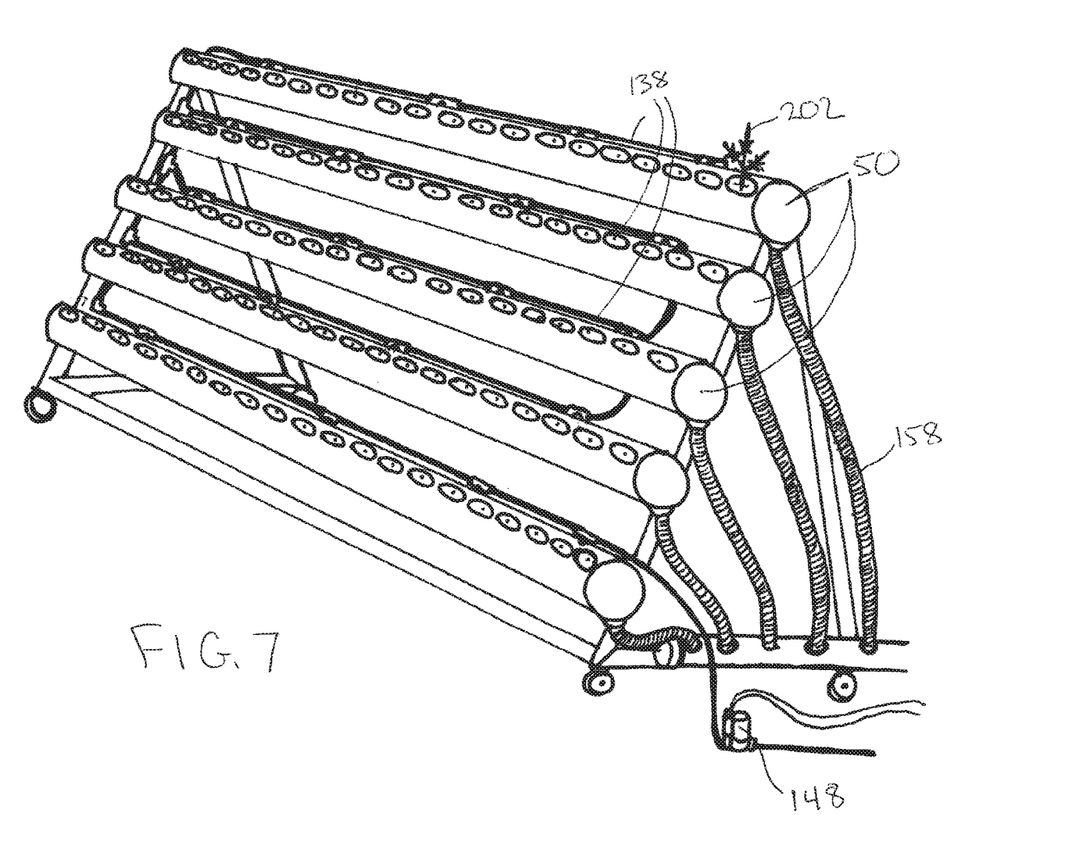
FIG. 7 is a perspective view of an fogponic root grower and associated piping in one embodiment.
Figure 8:
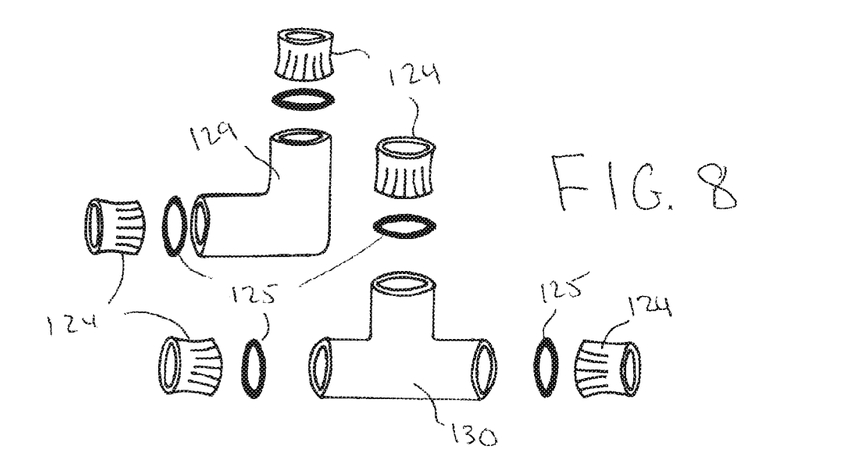
FIG. 8 is a perspective view of some of the pipe connectors according to one embodiment.

FIG. 7 is a perspective view of a fogponic root grower and associated piping according to one embodiment. This embodiment comprises a series of horizontally-oriented plant tubes 50, wherein each tube comprises a series of holes configured to one unit of support non-soil plant growth medium 22, supported with a root basket 20. In general the plant tubes 50, will be 4-inch tubes, although they can range in size as appropriate for the plants intended to be grown within. The root baskets 20, will generally be the same size as those used in the root enclosures, so will generally range in size from 3 to 5 inches in diameter.

In one embodiment, the high-pressure tubing 138, the fluid flow of which is controlled by a solenoid valve 148, delivers nebulized fluid 101 to the roots 2. The high-pressure fluid distribution network is similar to the embodiment depicted in FIG. 5. The spray nozzles 140 are appropriately spaced apart, for example 12 inches apart. Unabsorbed fluid is drained off and removed by flexible drain pipes 158.

The Vegetative Region

Light

With reference to FIG. 14, the system further includes a lighting system associated with the vegetative region above the root enclosures 4 and configured for emitting light in vegetative region. In one embodiment, lighting system may include a plurality of lighting units 230 wherein a group of root enclosures 4 are associated with one lighting unit 230 in an arrangement as depicted in FIG. 14.

Lighting units 230 may be driven by a light driver 236 and powered by a power source 238. Light driver 236 may drive a plurality of lighting units 230 or each lighting unit 230 independent of one another. Lighting units 230 may be, for example, High Pressure Sodium lights.

In one embodiment the lights can be turned on and off for different periods of time. For example, in one embodiment the lights may remain on for about 18-hours during vegetative growth and about 12 hours during the flowering period.

HVAC

Heating, ventilation, and air conditioning are monitored and managed to meet the vegetative requirements of the particular plant species.

Water Purification

Figure 11:
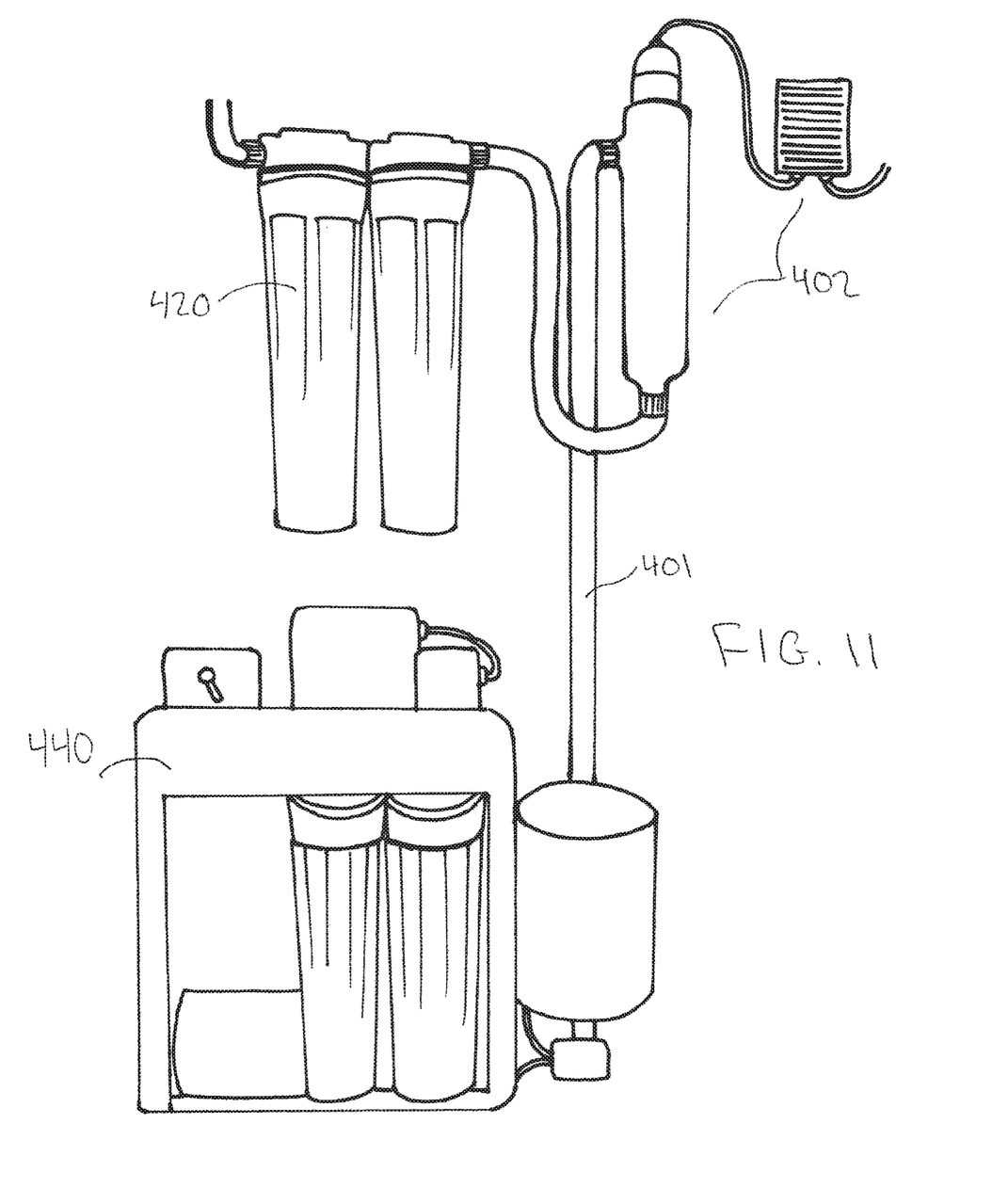
FIG. 11 is a perspective view of the water purification system according to one embodiment.
Figure 12:
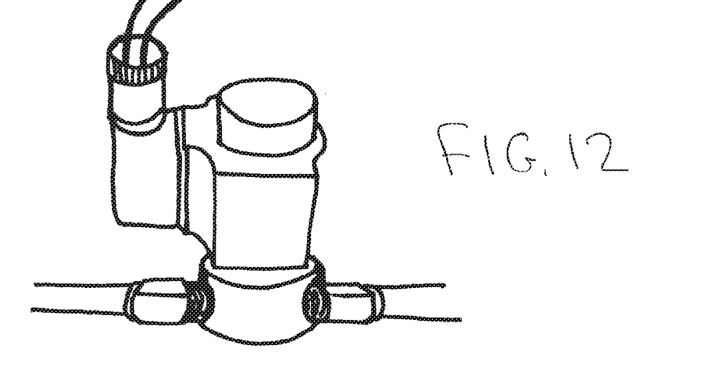
FIG. 12 is a perspective view of a solenoid valve.
Figure 13:
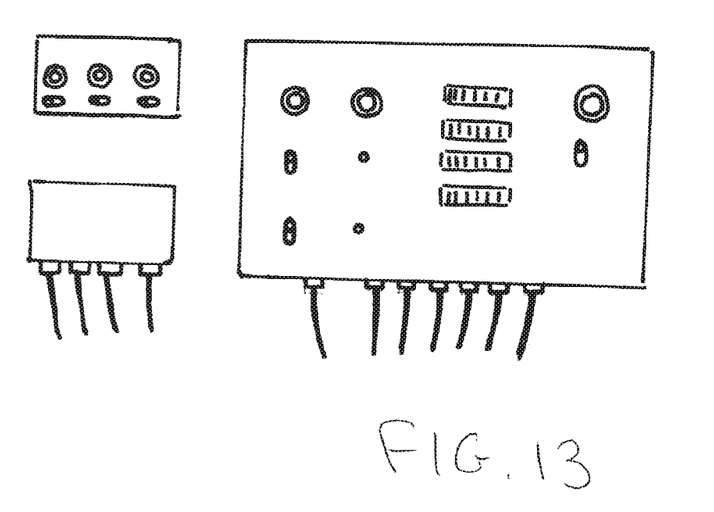
FIG. 13 is a perspective view of the system controller according to one embodiment.

FIG. 11 illustrates one embodiment of a water purification system that can be used within this aeroponics system, comprising a UV light sterilizer 402, PRE system filters 420, and a reverse osmosis unit 440.

Monitoring System

In one embodiment, the system may include a plurality of sensors for collecting data from certain system components to provide information regarding the efficiency and operation of the system.

One embodiment of a monitoring system is depicted in FIG. 6, wherein the safety controller 111 receives input from a number of sensors, which are continuously monitoring the environment. If any problems are detected that could cause harm to the plants, the safety controller 111 sends out a number of signals that can immediately shut down critical elements. For example, if the fluid delivery needs to be interrupted, the safety controller 111, sends signals to the fluid delivery controller 110 to shut off delivery of the high-pressure fluid 101 by closing solenoid valves 150, 152, the pumps, etc.

In some embodiments, the monitoring system may have a general system controller 320, which will send signals to many diverse aspects of the environment, such as, for example sending signals to the light driver 236 to turn off the lighting units 230. In one embodiment there is a pressure sensor operatively associated with the high-pressure pump solenoid 109, which is configured to detect any pressure drop below 150 psi, whereupon it will send a signal to shut down the entire system including the lights and an alarm signal.

For example, in one embodiment sensors such as thermistors may be associated with each root enclosure 4 to measure the temperature, pH and humidity, etc. within the container 6. When fluid is sprayed into the container, the temperature would drop which would be registered by the thermistor. This information would be relayed to the central control indicating that the fluid delivery cycle functioned properly. If the temperature did not drop, the system would register a malfunction and immediately shut off the light and send an alarm to the responsible party who could fix the problem, with reference to which root enclosure 4 malfunctioned. In one embodiment, each root enclosure 4 would also include a sensor configured to measure the concentration of nutrient being delivered to the root zones of each plant.

A fluid sensor 308 may be associated with the nutrient fluid reservoir 104 and configured for detecting the temperature, pH, electro-conductivity, and nutrient levels of the fluid contained within nutrient fluid reservoir 104. Further, an environmental sensor 306 may be included to collect ambient data within the area that the zones are located in, such as, but not limited to, temperature, humidity, $CO_2$, electricity, light quality, and light intensity. It should be understood that the data collected from each of the above-referenced sensors may be by a wired or wireless connection.

It is not Intended to limit the present invention to the figures provided, or to limit the system to a particular grid design. The setup described for utilizing the present invention and its devices is modular by nature, and therefore it is desired to disclose the spirit of the invention and allow one skilled in the art to utilize such a disclosure to increase growth potential, modularity and harvest cycle of a desired crop.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A fogponic plant growth system for growing plants with roots physically and fluidly isolated from one another, comprising:

a plurality of root enclosures each comprising an "open drain", and configured for supporting one plant, wherein two or more root enclosures are positioned in a row, and rows are arranged in parallel;

a high pressure pump system that is in fluid communication with one or more fluid reservoirs, wherein the high pressure pump system is configured for drawing fluid from the one or more reservoirs;

a high pressure fluid delivery system configured for fluidly connecting each of the root enclosures to the high pressure pump system, wherein the high pressure fluid delivery system includes one or more pressure stop valves configured to regulate the flow of fluid to the root enclosures;

a plurality of spray nozzles operatively associated with the high pressure fluid delivery system, the plurality of spray nozzles including at least one of the spray nozzles positioned within each of the root enclosures to direct a spray towards roots in the root enclosure, and a control system for directing the high pressure pump system and the pressure stop valves;

wherein, when one or more of the spray nozzles are connected to an associated pressure stop valve "in an on position", the associated pressure stop valve "in the on position" allows fluid to flow from the high pressure pump system through the associated pressure stop valve to the one or more spray nozzles connected to the associated pressure stop valve "in the on position";

wherein, when one or more of the spray nozzles are connected to an associated pressure stop valve "in an off position", the associated pressure stop valve "in the off position" prevents fluid from flowing from the high pressure pump system through the associated pressure stop valve to the one or more spray nozzles connected to the associated pressure stop valve "in the off position" while other ones of the plurality of spray nozzles connected to the fluid delivery system remain fluidly connected to the high pressure pump system;

wherein the high pressure pump system is configured to operate at pressures between 500 psi and 3,000 psi.

2. The fogponic plant growth system according to claim 1, wherein the spray nozzles of the plurality of spray nozzles are capable of providing fluid in a 5-30 μm mist.

3. The fogponic plant growth system according to claim 1, further comprising a lighting system associated with the root enclosures wherein the lighting system is configured for emitting light toward a vegetative zone.

4. The fogponic plant growth system according to claim 3, wherein the lighting system includes a plurality of lighting units, wherein each of the root enclosures is associated with at least one of the plurality of lighting units.

5. The fogponic plant growth system according to claim 1, wherein each row shares access to a common main drain pipe.

6. The fogponic plant growth system according to claim 5, wherein:
the fogponic plant growth system comprises a plurality of zones wherein each of the zones includes one or more rows of the root enclosures;
at least one of the pressure stop valves is configured to regulate the flow of fluid to each of the zones;
the control system in communication with the pressure stop valves is configured for independently adjusting the pressure stop valves to control the amount of fluid that is provided to each of the zones.

7. The fogponic plant growth system according to claim 1, comprising a lighting system wherein the lighting system includes a plurality of lighting units, wherein each of the plurality of root enclosures is associated with one of the plurality of lighting units and wherein each of the plurality of lighting units is controlled independently by the control system.

8. The fogponic plant growth system according to claim 7, further comprising a monitoring system comprising:
one or more sensors located in one of the root enclosures and configured to measure one or more of temperature, pH, and humidity within the root enclosure; and
wherein the control system is configured to control the lighting system to turn on or off one or more of the lighting units in response to relayed information from the one or more sensors.

9. The fogponic plant growth system according to claim 1, wherein:
the high pressure pump system comprises a pre-pump and a high pressure pump, the pre-pump configured to draw fluid from the one or more reservoirs and to feed the fluid to the high pressure pump; and
the high-pressure pump is configured to operate at a first pressure between 500 psi and 3,000 psi.

10. The fogponic plant growth system according to claim 1, wherein:
the fogponic plant growth system comprises a plurality of zones and each of the plurality of zones includes a plurality of the root enclosures;
the zones are in fluid isolation from each other; and
the high pressure fluid delivery system comprises tubes that fluidly connect those of the plurality of spray nozzles in each of the zones to an output of the high pressure pump system.

11. The fogponic plant growth system according to claim 10, wherein:
the one or more fluid reservoirs comprise a plurality of fluid reservoirs that respectively contain a plurality of different fluids; and the control system is programmed to deliver different fluids to the root enclosures for specific periods of time, spaced apart by specific intervals.

12. The fogponic plant growth system according to claim 1, wherein:
the high pressure fluid delivery system comprises a plurality of modular units, each of the modular units configured to fluidly connect one of the root enclosures to the high pressure pump system.

13. The fogponic plant growth system according to claim 1, wherein:
the plurality of spray nozzles includes first and second spray nozzles operatively associated with the high pressure delivery system, both of the first and second spray nozzles positioned within one of the root enclosures; and
the first and second nozzles are connected by and extend linearly off of an enclosure tube.

14. The fogponic plant growth system according to claim 1, further comprising a sensor connected to provide an input to the control system wherein the sensor is configured to measure one or more of temperature, pH, and humidity within one of the root enclosures.

15. The fogponic plant growth system according to claim 1, further comprising a plurality of sensors wherein each of the plurality of sensors is positioned in a corresponding one of the root enclosures, is connected to provide an input to the control system, and is configured to measure one or more of temperature, pH, and humidity within the corresponding one of the root enclosures.

16. The fogponic plant growth system according to claim 1, further comprising a monitoring system comprising:

a plurality of sensors wherein each of the plurality of sensors is located in a corresponding one of the root enclosures and configured to measure one or more of temperature, pH, and humidity within the corresponding root enclosure; and a system controller configured to receive a signal from each of the plurality of sensors and to control the control system to operate one or both of the high pressure pump system and the pressure stop valves in response to the signals from the plurality of sensors.

17. The fogponic plant growth system according to claim 1, wherein the high pressure pump system comprises a purification system for sterilizing fluid from the one or more reservoirs.

18. The fogponic plant growth system according to claim 1, comprising a computerized sensing system operative to monitor growth history of individual plants being grown in the fogponic plant growth system.

19. A method of growing plants comprising the steps of:
introducing plants into one or more root enclosures of the fogponic plant growth system of claim 1, and
supplying nutrient fluid and light to the one or more root enclosures.

20. A fogponic root growth system for growing the roots of young plants, comprising:
a plurality of horizontally-oriented plant tubes, each tube comprising a series of holes configured to house a root basket dimensioned to contain one unit of support non-soil plant growth medium therein;
a high pressure pump system that is in fluid communication with one or more fluid reservoirs, wherein the high pressure pump system is configured for drawing fluid from the one or more reservoirs;
a high pressure fluid delivery system configured for fluidly connecting each of the root enclosures to the high pressure pump system, wherein the high pressure fluid delivery system includes one or more pressure stop valves each of the pressure stop valves configured to regulate the flow of fluid to an associated one or more of the plant tubes;
a plurality of spray nozzles operatively associated with the high pressure fluid delivery system each of the plurality of spray nozzles positioned within a corresponding one of the plant tubes and directed towards a root zone of the corresponding plant tube, and
a control system for directing the high pressure pump system and the pressure stop valves;
wherein, when one of the one or more pressure stop valves is "in an on position", the pressure stop valve "in the on position" allows fluid to flow from the high pressure pump system through the pressure stop valve "in the on position" to one or more of the plurality of spray nozzles that are associated with the pressure stop valve "in the on position";
wherein, when one of the pressure stop valves is "in an off position", the pressure stop valve "in the off position" prevents fluid from flowing from the high pressure pump system through the pressure stop valve "in the off position" to one or more of the plurality of spray nozzles that are associated with the pressure stop valve "in the off position" other ones of the plurality of spray nozzles connected to the fluid delivery system remain fluidly connected to the high pressure pump system;
wherein the high-pressure pump system is configured to operate at pressures between 500 psi and 3,000 psi.

* * * * *